United States Patent [19]
Iwata et al.

[11] 3,810,520
[45] May 14, 1974

[54] AUTOMATIC DAMPING DEVICE FOR BRAKING A VEHICLE

[75] Inventors: Masayoshi Iwata, Gifu; Tsuneo Maeda, Aichi, both of Japan

[73] Assignee: Kabushiki Kaisha Tokai Rika Denki Seisakusho, Aichi-ken, Japan

[22] Filed: Dec. 28, 1971

[21] Appl. No.: 213,186

[30] Foreign Application Priority Data
Dec. 28, 1970  Japan............................ 45-132555
Dec. 28, 1970  Japan............................ 45-132556

[52] U.S. Cl. ........... 180/103, 188/110, 280/150 AB
[51] Int. Cl. ............................................. B60t 7/12
[58] Field of Search ...... 280/150 AB; 180/103, 104, 180/82; 188/110, 181

[56] References Cited
UNITED STATES PATENTS

| | | |
|---|---|---|
| 2,762,476 | 9/1956 | Gaylord et al. .................... 192/3 H |
| 3,495,675 | 2/1970 | Hass et al. .......................... 180/103 |
| 2,020,160 | 11/1935 | Revett................................ 180/103 |
| 3,645,352 | 2/1972 | Stark................................ 180/82 R |
| 2,991,839 | 7/1961 | De Remer........................... 188/110 |
| 3,698,772 | 11/1972 | Nixon ............................. 188/181 A |
| 3,667,811 | 6/1972 | Okamoto et al. ............... 188/181 A |
| 3,470,974 | 10/1965 | Pefine................................. 188/110 |
| 3,486,799 | 12/1969 | Greentree........................... 180/103 |

*Primary Examiner*—Kenneth H. Betts
*Attorney, Agent, or Firm*—Steward and Kolasch, Ltd.

[57] ABSTRACT

The present disclosure is directed to an automatic damping device for use in vehicles, said device being activated by collision of the vehicle and without the operation of the brake pedal by the driver. In a further embodiment of the present disclosure, the damping condition of the vehicle can be obtained and maintained in a collision situation as soon as the driver depresses the brake pedal. The function of the device does not interfere with the regular braking operation so as to insure the regular braking operation under normal operating conditions.

11 Claims, 2 Drawing Figures

AUTOMATIC DAMPING DEVICE FOR BRAKING A VEHICLE

BACKGROUND OF THE INVENTION

The present invention relates to an automatic damping device for use in a vehicle, wherein a vehicle is involved in an accident, and particularly when a collision has taken place, said damping device automatically applies the brake means disposed in the vehicle to immediately bring the vehicle to stop.

Since the vehicle has been gradually improved for higher speed driving in recent years with the development of the expressway network, traffic accidents have accordingly increased in number. Recently, measures have been taken to prevent the accidents from becoming more serious by providing safety seat belts or an air bag device which is immediately inflated by compressed air at the time of the collision of the vehicle. These devices prevent passengers from crashing into the windshield or other portions of the vehicle.

When a collision has occurred, a driver instinctively tries to step on the brake pedal to bring the vehicle to a sudden stop. However, the driver often loses consciousness before the vehicle is brought to a complete stop, and thus ceases depressing the brake pedal further, whereby the vehicle continues to move due to inertia, so that additional injury may result.

SUMMARY OF THE INVENTION

An object of the present invention is to provide an automatic damping device for use in a vehicle, which causes the vehicle to reliably, immediately and automatically stop, wherein an acceleration switch for regulating air supply into an air bag is adapted to be switched on and simultaneously, a damping device for the braking means is automatically applied. The vehicle automatically stops in collision, even when a driver has lost consciousness or the braking operation of the braking means has been restricted by the function of the air bag.

Another object of the present invention is to provide an automatic damping device for use in a vehicle, which can bring the vehicle to a complete stop, thereby preventing the accident from becoming more serious. According to the present invention, an acceleration switch for regulating air supply into an air bag, and a control unit switch which retains the closed position thereof for a fixed period, once it is actuated are associated with a driving unit such as a solenoid or the like connected therewith to perform the same functions as when the brake pedal of the vehicle is manually applied. Thus the braking condition of the vehicle is maintained for a fixed period following the collision.

A further object of the present invention is to provide an automatic damping device for use in a vehicle wherein, even if a driver steps on the brake pedal of the vehicle when the acceleration switch for regulating air supply into an air bag has been activated, the braking operation of the brake pedal is maintained so that even when the driver has become unconscious or the braking operation by the driver is restricted by the action of the air bag, the vehicle is forced to stop immediately and reliably.

A still further object of the present invention is to provide an automatic damping device for use in a vehicle wherein an acceleration switch for regulating air supply into an air bag, and a control unit switch which retains the closed position thereof for a fixed period of time once it is activated are associated with, a check valve of electromagnetic type. These elements are in turn connected into a hydraulic circuit to retain the damping condition of the vehicle for fixed time after collision, whereby the vehicle is brought to a complete stop in such a manner as to prevent the accident from becoming more serious.

A still further object of the present invention is to provide an automatic damping device for use in a vehicle which is capable of performing the normal braking operation, wherein the automatic damping device is adapted not to interfere with the general braking mechanism and operation associated with the ordinary driving of the vehicle.

Another still further object of the present invention is to provide an automatic damping device for use in a vehicle which is simple, compact and light-weight in construction, reasonable in manufacturing cost, and capable of performing its intended function in an entirely, automatically, satisfactory and trouble-free manner and may be easily arranged even in an existing vehicle.

The present invention will become more fully understood from the detailed description given hereinbelow and the accompanying drawings which are given by way of illustration only and thus are not limitative of the present invention and wherein, FIG. 1 is a schematic illustrating circuit diagram showing one embodiment of an automatic damping device for use in a vehicle according to the present invention; and FIG. 2 is a schematic illustrating circuit diagram showing another embodiment of the present invention.

DESCRIPTION OF THE PREFERRED EMBODIMENTS

Figure 1:
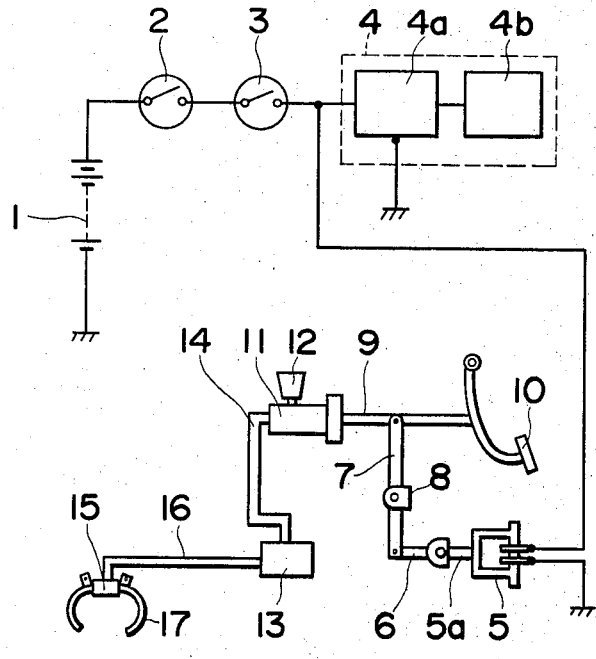

Before we proceed with the description of the present invention, it is to be noted that like parts are designated by like reference numerals throughout the several views of the accompanying drawings. In addition, it is to be noted that a device constructed in accordance with the present invention is adapted for use in conjunction with any vehicle having brake means, brake pedal and the like. However, for the sake of brevity, the description of the vehicle structure is herein omitted, since such vehicle structures are well known in the art.

Referring now to FIG. 1, reference numeral 1 is a power supply, such as a battery or the like, disposed in a vehicle with its negative pole connected to a ground. An acceleration switch 2 is connected with the positive pole of the power supply 1 at its one end and a control unit switch 3 is connected to the non-power supply side of the acceleration switch 2 at its other end. The acceleration switch 2 is adapted to close when a considerable, powerful acceleration is applied upon the vehicle due to collision and the control unit switch 3 is adapted to close through its operative association with the acceleration switch 2 when it has been closed. A conventional self-energized timer associated with the control unit switch maintains said switch in the closed position for a fixed period. A collision shock absorbing device 4 communicates with the control unit switch 3 and comprises a percussion lock 4a which is actuated by the closing of the control unit switch 3 and an air bag 4b which becomes inflated with compressed air by the operation of the percussion lock 4a, thus preventing the passenger from crashing into the vehicle. The construction of the acceleration switch 2, control unit switch 3, and collision shock absorbing device 4 are well known in the art. A solenoid means 5 is excited by the closing of the control unit switch 3, with an absorption lever 5a being drawn by the exciting force of the solenoid means 5. A coupling lever 6 is pivoted to the absorption lever 5a of the solenoid means 5 at one of its ends and a rotating lever 7 is rotatably pivoted to a support member 8 at approximately its middle portion, and further pivotably connected to the coupling lever 6 at its one end and to the middle portion of a piston rod 9 at its other end. A piston rod 9 is coupled to a brake pedal 10 at its one end. Reference numeral 11 is a brake master cylinder, numeral 12 shows a reserve tank, and numeral 13 denotes a release master cylinder. A main pipe 14 is connected between the release master cylinder 13 and brake master cylinder 11. Reference numeral 15 is a wheel cylinder and numeral 16 represents a branch pipe connected between the wheel cylinder 15 and release master cylinder 13. Reference numeral 17 is a brake lining. It is to be noted that the constructions of the parts designated by reference numerals 9 through 17 among the reference numerals described hereinbefore are already provided on existing vehicles and thus, are well known in the art.

The function of the automatic damping device of the present invention will be hereinafter described based on the above-mentioned construction of the parts. To apply the brake in the ordinary driving of a vehicle, the brake pedal 10 has to be depressed, whereby the braking is applied to the vehicle in the same manner as in the well known braking operation. Thus, the piston rod 9 is moved to the left in the drawing, and the oil in the reserve tank 12 is forced into the wheel cylinder 15 through the main pipe 14, release master cylinder 13 and branch pipe 16 by means of the brake master cylinder 11. Accordingly, the brake lining 17 of the wheel cylinder 15 is operated to apply the braking action for the vehicle as is well known in the art.

As substantial acceleration is applied upon the vehicle by collision, the acceleration switch 2 is closed thereby closing the control unit switch 3, whereby the percussion lock 4a is ignited and the air bag 4b is inflated to operate the collision shock absorbing device 4. Furthermore, when the control unit switch 3 is closed, the solenoid means 5 is excited to operate the absorption lever 5a, whereby the coupling lever 6 is moved to the right in the drawing. In turn, the rotating lever 7 is rotated in an anti-clockwise direction with the support member 8 as a supporting point, to cause the piston rod 9 to move to the left in the drawing. Accordingly, the damping is applied to the vehicle by the same action as in the general braking operation.

In place of the solenoid means as described in the above embodiment, for example, a combination of a pump and a cylinder may be used in a well known manner.

The present invention is adapted to operate the driving unit such as the solenoid means, etc. to automatically perform the damping operation for the vehicle by the action of the acceleration switch and control unit switch which retains a closed position for a fixed period of time by closing the acceleration switch. The moment the vehicle collides, the damping device therefor is automatically and immediately applied. Accordingly, the vehicle is brought to an immediate stop, even when the driver has been rendered unconscious. The stopped condition is maintained for a fixed period of time, whereby personal injury and vehicle damage are substantially minimized. Furthermore, the above-mentioned damping function is adapted not to interfere with the ordinary braking mechanism of the vehicle, allowing the normal braking operation to be performed at normal times.

Figure 2:
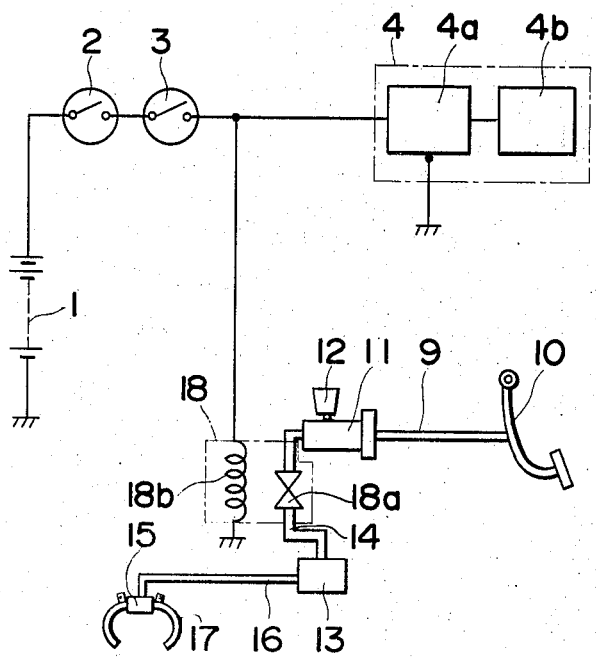

Although the device of the present invention as shown in FIG. 1, is automatically actuated without the operation of the brake pedal by the driver, a device of almost the same construction as hereinabove described can be applied so as to obtain the damping condition of the vehicle as soon as the driver depresses the brake pedal, as shown in FIG. 2.

FIG. 2 shows another embodiment in accordance with the present invention. Referring to FIG. 2, each component 1, 2, 3, 4, 9, 10, 11, 12, 13, 14, 15, 16 and 17 is the same as that of FIG. 1. In the embodiment of FIG. 2, an electromagnetic device 18 coupling a check valve 18a and a exciting coil 18b, which is excited by closing the control unit switch 3 is provided within the hydraulic circuit of the braking means. That is, the check valve 18a of the electromagnetic type, which operates to close upon the excitation of exciting coil 18b, is connected with the main pipe 14, while the exciting coil 18b of the electromagnetic valve is connected between the non-power supply side of the control unit switch 3 and the ground.

The function of the device shown in FIG. 2 will be described hereinafter based on the construction as hereinabove described. To apply the damping in the ordinary driving of the vehicle, the brake pedal 10 has to be depressed, thereby the braking is applied to the vehicle, based on the same actions as in the well known general braking operation. Namely, the piston rod 9 is moved to the left in the drawing, and the oil in the reserve tank 12 is forced into the wheel cylinder 15 through the main pipe 14, release master cylinder 13 and branch pipe 16 by means of the brake master cylinder 11. Accordingly, the brake lining 17 is operated to apply the braking action.

As substantial acceleration is applied upon the vehicle by collision, the acceleration switch 2 is closed which, in turn closes the control unit switch 3, whereby the percussion lock 4a is ignited and the air bag 4b is inflated to operate the collision shock absorbing device 4. On the other hand, as soon as the control unit switch 3 is closed, the exiting coil 18b of the electromagnetic valve 18 is excited, whereby the check valve 18a closes the main pipe 14. The check valve 18a is adapted to pass the oil which flows from the brake master cylinder 11 to the release master cylinder 13, and to check the oil which flows in the direction opposite thereto.

In general collision situations or other types of accidents, the driver usually steps on the brake pedal 10 reflexively. Accordingly, once the oil in the reserve tank 12 is fed into the wheel cylinder 15 by depressing the brake pedal 10 by the driver, the oil is prevented from returning by the check valve 18a, whereby even if the driver releases his foot from the brake pedal 10 thereafter, the damping operation for the vehicle is maintained to stop the vehicle without fail.

Accordingly, the present invention is adapted to operate an electromagnetic check valve provided in a hydraulic circuit of the brake system of the vehicle by the operation of the acceleration switch and control unit switch which is maintained in the closed condition for a fixed period of time, said operation being initiated by the closing of the acceleration switch. Accordingly, if the driver steps on the brake simultaneously with the collision, the damping is applied upon the vehicle. Thus, even when the driver has been rendered unconscious, the vehicle is brought to a stop. As the standing condition is retained for a fixed time, the vehicle stops without fail, whereby the damages due to accidents can be substantially minimized. As the above function does not interfere with the ordinary braking mechanism, the regular braking operation can also be accomplished at ordinary times.

The present invention being thus described, it will be obvious that the same may be varied in many ways. Such variations are not to be regarded as a departure from the spirit and scope of the invention, and all such modifications as would be apparent to one skilled in the art are intended to be included within the scope of the invention.

It is claimed:

1. An automatic brake-activating apparatus for use in a vehicle which comprises a brake means for braking the vehicle, an acceleration switch means adapted to close upon the detection of an abnormal rapid deceleration of the vehicle, control unit switch means electrically connected with the acceleration switch means, said control unit switch means including timing means adapted to close through said electrical connection and maintain a closed position for a fixed period of time and driving unit means operatively associated with the brake means and electrically connected to the control unit switch means for operating said brake means, said driving unit means being automatically actuated in response to said control unit switch means.

2. The apparatus of claim 1, wherein a manually operated brake pedal is also operatively associated with the brake means.

3. The apparatus of claim 1, wherein the drive unit means comprises a solenoid means and a plurality of lever means.

4. The apparatus of claim 1, wherein a power supply means is in operative communication with the acceleration switch means.

5. An automatic brake-actuating apparatus for use in a vehicle which comprises a brake means containing a hydraulic circuit means for braking the vehicle, an acceleration switch means adapted to close upon the detection of an abnormal condition of the vehicle, control unit switch means electrically connected with the acceleration switch means, said control unit switch means including timing means adapted to close through said electrical connection and maintain a closed position for a fixed period of time, and valve means disposed in the hydraulic circuit means and electrically connected with the control unit switch means said valve means being automatically actuated in response to said control unit switch means for operating the brake means.

6. The apparatus of claim 5, wherein a manually operated brake pedal is also operatively associated with the brake means.

7. The apparatus of claim 5, wherein the valve means is an electromagnetic check valve means.

8. The apparatus of claim 5, wherein a power supply means is in operative communication with the acceleration switch means.

9. An automatic brake-actuating apparatus for use in a vehicle which comprises a brake means for braking the vehicle, an acceleration switch means adapted to close upon the detection of an abnormal rapid deceleration of the vehicle, control unit switch means electrically connected with the acceleration switch means, said control unit switch means being adapted to close through said electrical connection and maintain a closed position for a fixed period of time, and driving unit means including a solenoid means and a plurality of lever means operatively associated with the brake means and electrically connected to the control unit switch means for operating said brake means, said solenoid means automatically actuating the plurality of lever means and thus the brake means in response to the control unit switch means, the closing of said control unit switch means also electrically actuating a collision shock-absorbing device.

10. An automatic brake-activating apparatus for use in a vehicle which comprises a brake means for braking the vehicle, an acceleration switch means adapted to close upon the detection of an abnormal rapid deceleration of the vehicle, control unit switch means electrically connected with the acceleration switch means, said control unit switch means being adapted to close through said electrical connection and maintain a closed position for a fixed period of time, a collision shock-absorbing device in operative communication with the control unit switch means, said collision shock-absorbing device comprising a percussion lock in communication with an air bag, said percussion lock being actuated by the closing of the control unit switch means and driving unit means operatively associated with the brake means and electrically connected to the control unit switch means for operating said brake means, said driving unit means being automatically actuated in response to said control unit switch means.

11. An automatic brake-actuating apparatus for use in a vehicle which comprises a brake means containing a hydraulic circuit means for braking the vehicle, an acceleration switch means adapted to close upon the detection of an abnormal condition of the vehicle, control unit switch means electrically connected with the acceleration switch means, said control unit switch means being adapted to close through said electrical connection and maintain a closed position for a fixed period of time, a collision shock-absorbing device in operative communication with the control unit switch means, said collision shock-absorbing device comprising a percussion lock in communication with an air bag, said percussion lock being actuated by the closing of the control unit switch means, and valve means disposed in the hydraulic circuit means and electrically connected with the control unit switch means, said valve means being automatically actuated in response to said control unit switch means for operating the brake means.

* * * * *